US012620016B2

(12) United States Patent
Min et al.

(10) Patent No.: US 12,620,016 B2
(45) Date of Patent: May 5, 2026

(54) ELECTRONIC DEVICE AND METHOD FOR RECOMMENDING ITEM TO USER

(71) Applicant: Samsung Electronics Co., Ltd., Suwon-si (KR)

(72) Inventors: Hwangki Min, Suwon-si (KR); Yoonyoung Nam, Suwon-si (KR); Jeongsoo Lee, Suwon-si (KR); Gunbong Lee, Suwon-si (KR); Changku Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 267 days.

(21) Appl. No.: 18/504,613

(22) Filed: Nov. 8, 2023

(65) Prior Publication Data

US 2024/0078589 A1 Mar. 7, 2024

Related U.S. Application Data

(63) Continuation of application No. PCT/KR2022/003901, filed on Mar. 21, 2022.

(30) Foreign Application Priority Data

Aug. 11, 2021 (KR) ........................ 10-2021-0105872

(51) Int. Cl.
    *G06Q 30/00* (2023.01)
    *G06Q 30/0601* (2023.01)
(52) U.S. Cl.
    CPC ................................ *G06Q 30/0631* (2013.01)
(58) Field of Classification Search
    CPC .............................................. G06Q 30/06–08
    See application file for complete search history.

(56) References Cited

U.S. PATENT DOCUMENTS 6,968,334 B2 11/2005 Salmenkaita et al.
11,244,017 B2 2/2022 Sayyadi et al.
(Continued)

FOREIGN PATENT DOCUMENTS

JP 2010-073195 A 4/2010
JP 2012-190061 A 10/2012
(Continued)

OTHER PUBLICATIONS

International Search Report dated Jun. 24, 2022, issued in International Patent Application No. PCT/KR2022/003901.
(Continued)

*Primary Examiner* — Ethan D Civan
(74) *Attorney, Agent, or Firm* — Jefferson IP Law, LLP

(57) ABSTRACT

An electronic device is provided. The electronic device includes a communication circuit for communicating with a server, a display, at least one processor connected, and a memory, wherein the memory stores instructions causing, when executed, the at least one processor to collect an intermediate operation value corresponding to an item to which a user responds among first items introduced to the user through the display, store the collected intermediate operation value, receive item information about second items and intermediate operation values, input, as an input value, the intermediate operation values received from the server, input first user information indicating a profile of the user and the user response item vector, obtain scores assigned to each of the second items from a result value output from the recommendation model, and provide the item information to the user through the display on the basis of the scores.

19 Claims, 8 Drawing Sheets

(56)  References Cited

U.S. PATENT DOCUMENTS

| | | | |
|---|---|---|---|
| 11,599,927 B1* | 3/2023 | Flunkert ................. | G06F 40/30 |
| 2007/0233571 A1* | 10/2007 | Eldering ............ | H04N 7/17318 |
| | | | 348/E7.071 |
| 2012/0233183 A1 | 9/2012 | Nakahashi et al. | |
| 2014/0058860 A1 | 2/2014 | Roh et al. | |
| 2015/0244789 A1 | 8/2015 | Nagasaka et al. | |
| 2017/0300814 A1 | 10/2017 | Shaked et al. | |
| 2017/0339458 A1 | 11/2017 | Patel et al. | |
| 2018/0260916 A1 | 9/2018 | Zaltzman et al. | |
| 2019/0166403 A1 | 5/2019 | Yelton et al. | |
| 2021/0142196 A1 | 5/2021 | R et al. | |
| 2021/0149671 A1* | 5/2021 | Sar Shalom ............. | G06N 3/08 |
| 2021/0319876 A1* | 10/2021 | Khwaja .................. | G06Q 10/00 |
| 2022/0108358 A1* | 4/2022 | Sun .................... | G06Q 30/0631 |

FOREIGN PATENT DOCUMENTS

| | | | |
|---|---|---|---|
| JP | 2016-071881 A | 5/2016 | |
| JP | 6634972 B2 | 1/2020 | |
| JP | 2020-510258 A | 4/2020 | |
| JP | 6960361 B2 | 11/2021 | |
| KR | 10-0961782 B1 | 6/2010 | |
| KR | 10-1573601 B1 | 12/2015 | |
| KR | 10-1719198 B1 | 3/2017 | |
| KR | 10-2020-0094162 A | 8/2020 | |
| KR | 10-2207251 B1 | 1/2021 | |
| KR | 10-2021-0031223 A | 3/2021 | |
| KR | 10-2240662 B1 | 4/2021 | |
| KR | 10-2282599 B1 | 7/2021 | |
| KR | 10-2443315 B1 | 9/2022 | |

OTHER PUBLICATIONS

Korean Office Action dated Aug. 26, 2025, dated in Korean Application No. 10-2021-0105872.

* cited by examiner

Figure 6:
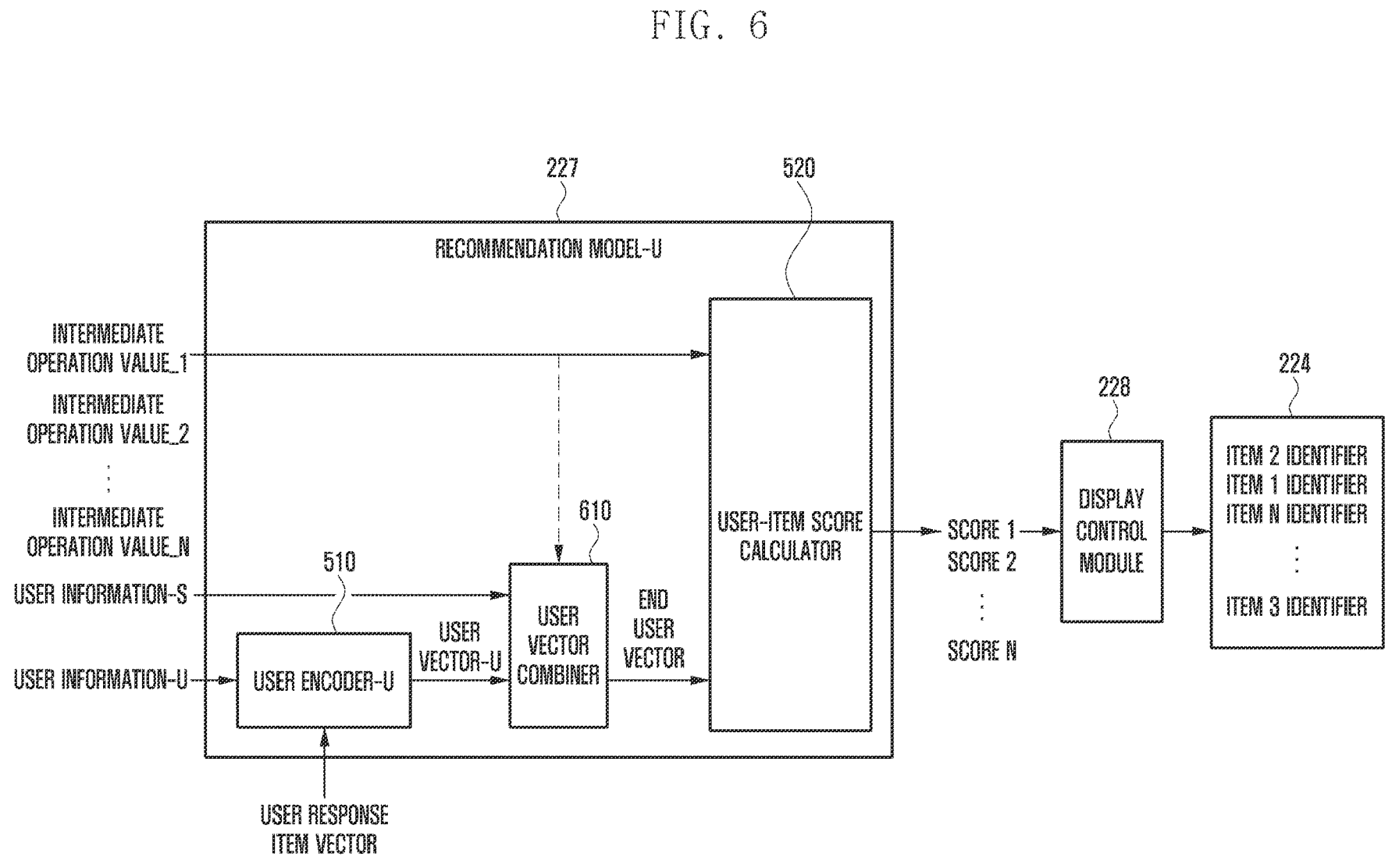

ITEM 2 IDENTIFIER
ITEM 1 IDENTIFIER
ITEM N IDENTIFIER
...
ITEM 3 IDENTIFIER

228

DISPLAY CONTROL MODULE

SCORE 1
SCORE 2
...
SCORE N

520

RECOMMENDATION MODEL-U

227

USER-ITEM SCORE CALCULATOR

610

END USER VECTOR

USER VECTOR COMBINER

510

USER VECTOR-U

USER ENCODER-U

USER RESPONSE ITEM VECTOR

INTERMEDIATE OPERATION VALUE_1
INTERMEDIATE OPERATION VALUE_2
...
INTERMEDIATE OPERATION VALUE_N
USER INFORMATION-S
USER INFORMATION-U

FIG. 8

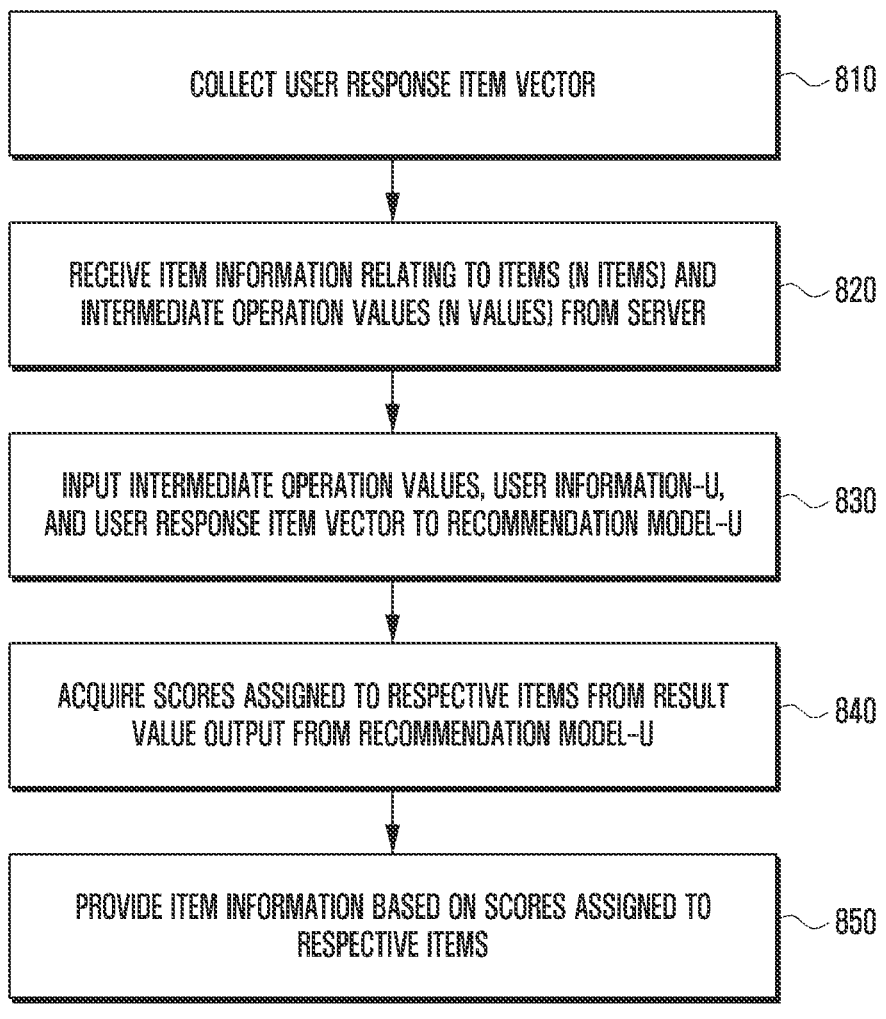

COLLECT USER RESPONSE ITEM VECTOR ~810

RECEIVE ITEM INFORMATION RELATING TO ITEMS (N ITEMS) AND INTERMEDIATE OPERATION VALUES (N VALUES) FROM SERVER ~820

INPUT INTERMEDIATE OPERATION VALUES, USER INFORMATION-U, AND USER RESPONSE ITEM VECTOR TO RECOMMENDATION MODEL-U ~830

ACQUIRE SCORES ASSIGNED TO RESPECTIVE ITEMS FROM RESULT VALUE OUTPUT FROM RECOMMENDATION MODEL-U ~840

PROVIDE ITEM INFORMATION BASED ON SCORES ASSIGNED TO RESPECTIVE ITEMS ~850

ELECTRONIC DEVICE AND METHOD FOR RECOMMENDING ITEM TO USER

CROSS-REFERENCE TO RELATED APPLICATION(S)

This application is a continuation application, claiming priority under § 365(c), of an International application No. PCT/KR2022/003901, filed on Mar. 21, 2022, which is based on and claims the benefit of a Korean patent application number 10-2021-0105872, filed on Aug. 11, 2021, in the Korean Intellectual Property Office, the disclosure of which is incorporated by reference herein in its entirety.

BACKGROUND

1. Field

The disclosure relates to an electronic device that recommends an item (or content) by using artificial intelligence.

2. Description of Related Art

A recommendation system may collect user information representing a user's individual profile and a user's response to an item, and may introduce an item that the user has not encountered yet to the user based on the collected user information. The recommendation system may input, as input values, user information and information about items to an artificial intelligence model with machine learning, and based on a result value (e.g., a score indicating the user's preference for each of the items) output from the artificial intelligence model, the system may arrange the items in descending order and preferentially provide an item with a higher ranking through a display of a user device.

The above information is presented as background information only to assist with an understanding of the disclosure. No determination has been made, and no assertion is made, as to whether any of the above might be applicable as prior art with regard to the disclosure.

SUMMARY

A recommendation system may be constructed in a server or a user device. In case of being constructed in the server, there is a risk that user information (personal profile) may be exposed to the outside. As the number of users to receive recommendation service increases and the recommendation service is required in real time, the cost of constructing the recommendation system in the server may increase. In case of being constructed in the user device, the performance of the recommendation system may be limited due to resources provided in the user device, and the user may have resistance to the resources of the user device (e.g., a processor, a memory) being put to the recommendation system.

According to various embodiments, some functions related to user personal information may be decomposed from a recommendation system (e.g., a recommendation model) and performed in an electronic device (e.g., a user device). The electronic device may prevent user information from being exposed to the outside as much as possible and provide a recommendation service at low cost/high efficiency.

Aspects of the disclosure are to address at least the above-mentioned problems and/or disadvantages and to provide at least the advantages described below. Accordingly, an aspect of the disclosure is to provide an electronic device that recommends an item (or content) by using artificial intelligence.

Additional aspects will be set forth in part in the description which follows and, in part, will be apparent from the description, or may be learned by practice of the presented embodiments.

In accordance with an aspect of the disclosure, an electronic device is provided. The electronic device includes a communication circuit configured to communicate with a server, a display, at least one processor connected to the communication circuit and the display, and a memory connected to the at least one processor, wherein the memory is configured to store instructions which, when executed by the at least one processor, cause the at least one processor to collect an intermediate operation value corresponding to an item to which a user has responded among first items introduced to the user through the display and store in the memory, the collected intermediate operation value as a user response item vector, receive item information about second items to be introduced to the user and intermediate operation values corresponding to the respective second items from the server through the communication circuit, input, as an input value, the intermediate operation values received from the server to a recommendation model trained using an artificial intelligence algorithm, input, to the recommendation model, first user information indicating a profile of the user and the user response item vector as a parameter for assigning a score to each of the second items, obtain scores assigned to each of the second items from a result value output from the recommendation model by inputting the input value and the parameter to the recommendation model, and provide the item information to the user through the display based on the scores assigned to each of the second items.

In accordance with another aspect of the disclosure, a recommendation system is provided. The recommendation system includes a server, and a user device. The server may be configured to encode a recommended item to be introduced to a user of the user device into an intermediate operation value represented by a plurality of real values, and transmit information regarding the recommended item and the intermediate operation value to the user device. The user device may be configured to encode first user information representing a profile of the user into a first user vector represented by a plurality of real values, assign a score to the recommended item by using the first user vector and the intermediate operation value received from the server, and control display of information regarding the recommended items based on the score.

In accordance with another aspect of the disclosure, a method for operating an electronic device is provided. The method includes collecting an intermediate operation value corresponding to an item to which a user has responded among first items introduced to the user through the display of the electronic device and storing, in the memory of the electronic device, the collected intermediate operation value as a user response item vector, receiving item information about second items to be introduced to the user and intermediate operation values corresponding to the respective second items from the server through the communication circuit of the electronic device, inputting, as an input value, the intermediate operation values received from the server to a recommendation model trained using an artificial intelligence algorithm and inputting, to the recommendation model, first user information indicating a profile of the user and the user response item vector as a parameter for assigning a score to each of the second items, obtaining scores assigned to each of the second items from a result value output from the recommendation model by inputting the input value and the parameter to the recommendation model, and providing the item information to the user through the display based on the scores assigned to each of the second items.

According to various embodiments, an electronic device can provide a recommendation service at low cost/high efficiency while preventing user information from being exposed to the outside as much as possible.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 2 illustrates a system configured to support a recommendation service according to an embodiment of the disclosure;

FIG. 6 is a block configuration diagram of a recommendation model-U according to an embodiment of the disclosure;

FIG. 8 is a flowchart illustrating operations of a processor for item recommendation in a user device according to an embodiment of the disclosure.

The same reference numerals are used to represent the same elements throughout the drawings.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
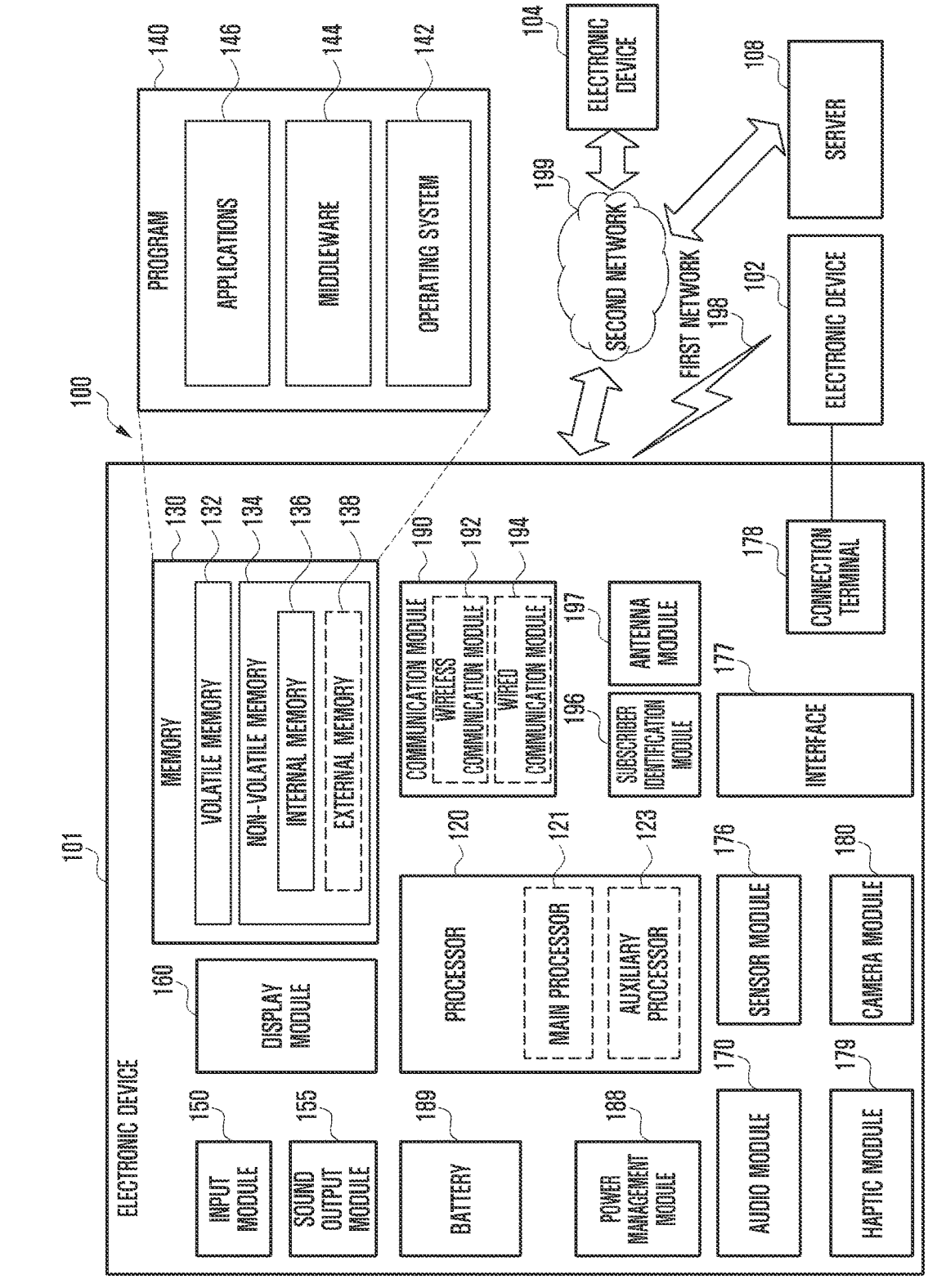
FIG. 1 is a block configuration diagram of an electronic device in a network environment according to an embodiment of the disclosure.

FIG. 1 is a block diagram illustrating an electronic device 101 in a network environment 100 according to an embodiment of the disclosure.

Referring to FIG. 1, an electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to one embodiment, the electronic device 101 may communicate with the electronic device 104 via the server 108. According to another embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may be configured to execute, for example, software (e.g., a program 140) to control at least one other component (e.g., a hardware or software component) of the electronic device 101 coupled with the processor 120, and may perform various data processing or computation. In one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to another embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, a communication processor (CP), and the like) that is operable independently from, or in conjunction with, the main processor 121. In an example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to one embodiment, the auxiliary processor 123 (e.g., an image signal processor or a communication processor) may be implemented as part of another component (e.g., the camera module 180 or the communication module 190) functionally related to the auxiliary processor 123. According to another embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, reinforcement learning, and the like. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may be configured to store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. In another embodiment, the input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to another embodiment, the receiver may be implemented as separate from, or as part of the speaker.

The display module 160 may visually provide information to the outside (e.g., a user) of the electronic device 101. In another embodiment, the display module 160 may include, for example, a display, a hologram device, or a projector and control circuitry to control a corresponding one of the display, hologram device, and projector. According to yet another embodiment, the display module 160 may include a touch sensor adapted to detect a touch, or a pressure sensor adapted to measure the intensity of force incurred by the touch.

The audio module 170 may convert a sound into an electrical signal and vice versa. According to another embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to another embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, an illuminance sensor, and the like.

The interface 177 may support one or more specified protocols to be used for the electronic device 101 to be coupled with the external electronic device (e.g., the electronic device 102) directly (e.g., wiredly) or wirelessly. According to another embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to yet another embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to still another embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. In one embodiment, the power management module 188 may be implemented as at least part of, for example, a power management integrated circuit (PMIC).

The battery 189 may supply power to at least one component of the electronic device 101. According to another embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to one embodiment, the communication module 190 may include a wireless communication module 192 (e.g., a cellular communication module, a short-range wireless communication module, or a global navigation satellite system (GNSS)

communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a $5^{th}$ generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. According to another embodiment, the wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a $4^{th}$ generation (4G) network, and next-generation communication technology, e.g., new radio (NR) access technology. The NR access technology may, for example, support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beam-forming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to another embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to one embodiment, the antenna module 197 may include an antenna including a radiating element composed of a conductive material or a conductive pattern formed in or on a substrate (e.g., a printed circuit board (PCB)). According to another embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to yet another embodiment, another component (e.g., a radio frequency integrated circuit (RFIC)) other than the radiating element may be additionally formed as part of the antenna module 197.

According to some embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may, for example, be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to another embodiment, all or some of operations to be executed at the electronic device 101 may be executed at one or more of the external electronic devices 102, 104, or 108. In an example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may, for example, provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to yet another embodiment, the external electronic device 104 or the server 108 may be included in the second network 199. The electronic device 101 may be applied to intelligent services (e.g., smart home, smart city, smart car, or health-care) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. In an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may, for example, include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

In an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to some embodiments, each component (e.g., a module or a program) of the above-described components may include a single entity or multiple entities, and some of the multiple entities may be separately disposed in different components. According to other embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
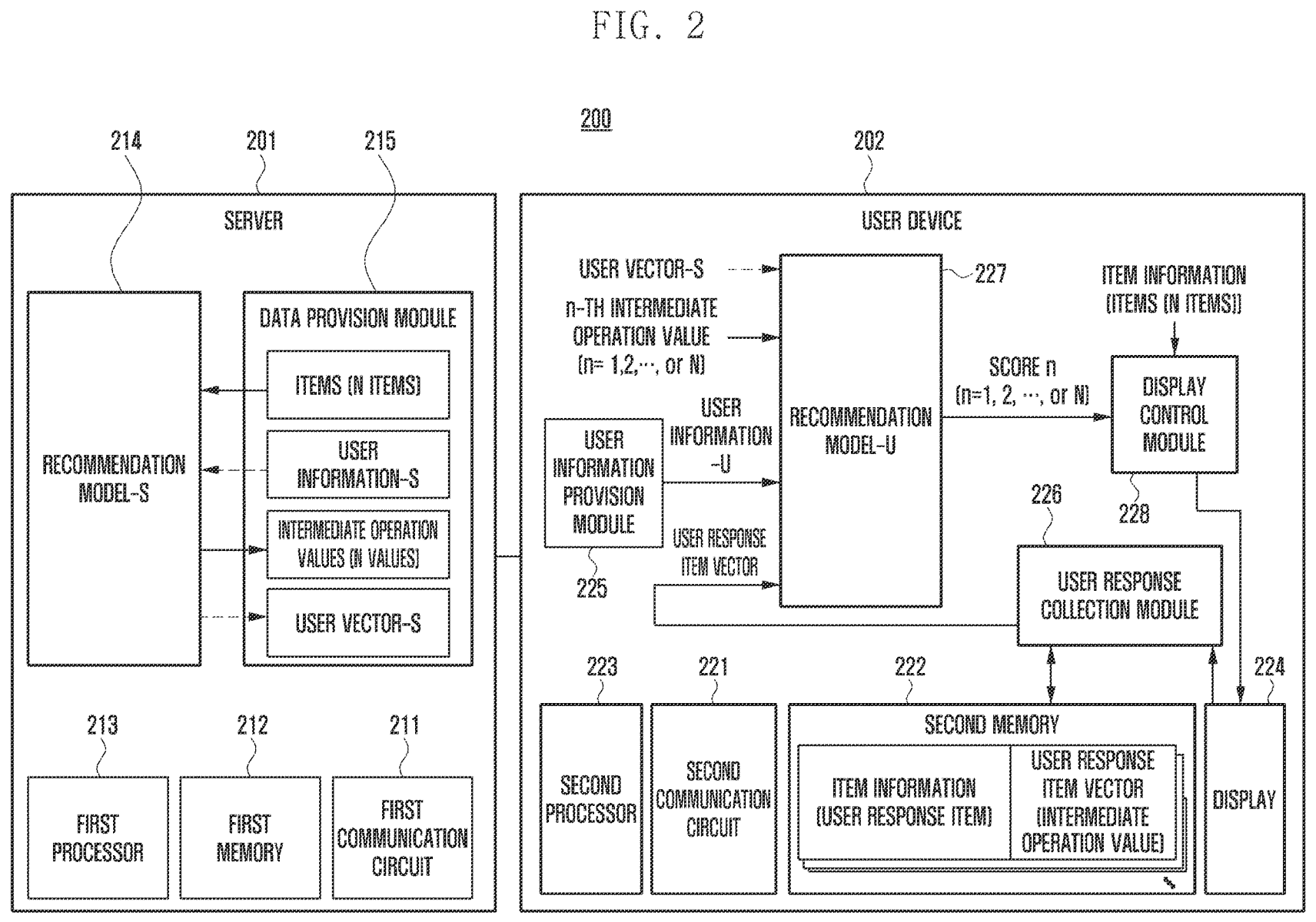

FIG. 2 illustrates a system 200 configured to support recommendation services according to an embodiment of the disclosure.

Components prefixed with "first" or suffixed with "-S" below may be components located in a server 201. Components prefixed with "second" or suffixed with "-U" may be components located in a user device 202. Data with the suffix "-S" may be data generated by the server 201 or data received by the user device 202 from the server 201. Data with the suffix "-U" may be data to which a user has responded among data generated by the user device 202, data stored in the user device 202, or data provided to the user by the user device 202. These suffixes and prefixes are for distinguishing components or data, and do not have a special meaning in and of themselves.

Referring to FIG. 2, a system 200 may include a server 201 and a user device 202. The server 201 (e.g., a server 108 in FIG. 1) may communicate with the user device 202 (e.g., an electronic device 101 of FIG. 1) via a network (e.g., a first network 198 and/or a second network 199 of FIG. 1). The server 201 may also communicate with other user devices (e.g., an electronic device 102 or 104 of FIG. 1) via a network.

The server 201 may include a first communication circuit 211, a first memory 212, a first processor 213, a recommendation model-S 214, and a data provision module 215. The first communication circuit 211, the first memory 212, and the first processor 213 may, for example, be implemented substantially the same as the communication module 190, the memory 130, and the processor 120 of FIG. 1, respectively, so as to perform the same function. The recommendation model-S 214 may be configured by an artificial intelligence model that is machine-trained using an artificial intelligence algorithm, and the artificial intelligence model may be stored in the first memory 212 and executed by the first processor 213. The data provision module 215 may, for example, be configured by instructions, and the instructions may be stored in the first memory 212 and executed by the first processor 213.

In an embodiment, the data provision module 215 may sequentially input N items to the recommendation model-S 214 as first input values. Items to be input to the recommendation model-S 214 may be configured by the same type of content as candidates to be recommended to the user of the user device 202. In an example, the data provision module 215 may input recent news articles, latest movies (or highlight videos thereof), or latest music to the recommendation model-S 214 as candidates to be recommended to the user. The recommendation module-S 214 may represent (or encode) the feature information (e.g., keywords, categories) of the input item n (where n is 1, 2, . . . , or N) into real values within a designated range (e.g., between –1 and 1), and may output the nth intermediate operation value (or item vector-S) including these real values as a result value. In another example, the intermediate operation value output by the recommendation module-S 214 may be represented by {0.13, –0.12, . . . , 0.56}. The data provision module 215 may receive N intermediate operation values from the recommendation model-S 214 as a result of inputting the N items to the recommendation model-S. In another embodiment, the data provision module 215 may transmit the N intermediate operation values to the user device 202 via the first communication circuit 211 along with the N items (or, item information representing the items). The item information may include, for each item, a site address for accessing a service provider (e.g., the server 201) that provides the item, an identifier (e.g., article title, thumbnail, still image), and metadata (e.g., actor, director, release date, etc., in case that the item is a movie).

The data provision module 215 may input user information-S, as a second input value, to the recommendation model-S 214. In another embodiment, the server 201 may recommend items to a user by transmitting items to the user device 202 through the first communication circuit 211, and may receive information about an item to which the user has responded (or user history items that have interacted with the user) among the recommended items from the user device 202. In yet another embodiment, the server 201 may estimate a user profile (e.g., interest, gender, age) based on feature information of an item to which the user has responded among items recommended to the user through the user device 202. The server 201 may use the estimated user profile as user information-S to be input to the recommendation model-S 214. The recommendation module-S 214 may, for example, represent the resulting value for the second input value (or the first input value and the second input value) as real numbers within a designated range (e.g., between –1 and 1) of the user information-S, and output a user vector-S including these real numbers as the resulting value. For example, the user vector-S output from the recommendation module-S 214 may be represented as {0.05, 0.83, . . . , 0.26}.

The data provision module 215 may receive the user vector-S from the recommendation model-S 214 as a result of inputting user information-S (or user information-S and N items) to the recommendation model-S. In another embodiment, the data provision module 215 may transmit the user vector-S to the user device 202 through the first communication circuit 211.

The user device 202 may include a second communication circuit 221, a second memory 222, and a second processor 223, a display 224, a user information provision module 225, a user response collection module 226, a recommendation model-U 227, and a display control module 228. The second communication circuit 221, the second memory 222, the second processor 223, and the display 224 may, for example, be implemented substantially the same as the communication module 190, the memory 130, the processor 120, and the display module 160 of FIG. 1, respectively, so as to perform the same function. The user information provision module 225, the user response collection module 226, and the display control module 228 may be configured by instructions, and the instructions may be stored in the second memory 222 and executed by the second processor 223. In still another embodiment, the recommendation model-U 227 may be configured by an artificial intelligence model that is machine-trained using an artificial intelligence algorithm, and the artificial intelligence model may be stored in the second memory 222 and executed by the second processor 223.

In an embodiment, the user information provision module 225 may acquire user information-U stored in the second memory 222 and input the acquired user information-U, as a first parameter, to the recommendation model-U 227. The user information provision module 225 may obtain a user profile (e.g., age, gender, address, hobbies, interests, favorite items) which is stored in the second memory 222 and is associated with a user account (e.g., email address) that the user uses to log into the user device 202. The user information provision module 225 may obtain a user profile (e.g., interests, preference for each type of item, favorite information, frequently used services, application list, or addresses (e.g., uniform resource locators (URLs) of frequently visited sites) produced by a profile prediction model installed on the user device 202 and stored in the second memory 222. For example, the profile prediction model may be an artificial intelligence model that is machine-trained using an artificial intelligence algorithm. The profile prediction model may receive, as input values, data (e.g., application usage history, browsing history, activity time, places visited) collected from an application (e.g., a web browser) installed on the user device 202 or from resources (e.g., a GNSS communication module, a gyro sensor) on the user device 202, and output a profile of the user as a result of the input values. In another embodiment, the user profile output from the profile prediction model may be stored in the second memory 222. The user information provision module 225 may input the user profile (user information-S) as a third input value to the recommendation model-U 227.

The user response collection module 226 may collect information about an item to which the user has responded among items recommended (or introduced) to the user through the display 224. The user response may include an interaction between the user and the user device 202 by means of an item. In an example, the user response collection module 226 may recognize, as a user response, that the user selects (e.g., touches) an item recommended to the user through the display 224. As another example, while a video is played as a recommended item through the display 224, the second processor 223 may display a user interface (UI) element for inducing a user response on the display 224. The UI element include, for example, a "like" button indicating that a user prefers the item, a "dislike" button indicating non-preference of the user, a "share" button to share the item with others, and a "save" button to save the item in the user device 202. The user response collection module 226 may collect information about the item corresponding to the user response when the user presses the "like," "share," or "save" button. In yet another embodiment, the user response collection module 226 may collect the intermediate operation value corresponding to the item to which the user has responded from among the intermediate operation values received from the server 201 via the second communication circuit 221. The user response collection module 226 may store the collected item information in the second memory 222 as history information indicating the results of the item recommendation. In still another embodiment, the user response collection module 226 may store the collected intermediate operation values in the second memory 222 as a user response item vector (or, item vector-U). The user response collection module 226 may input the user response item vector as a second parameter to the recommendation model-U 227.

When the user vector-S is received from the server 201 through the second communication circuit 221, the user device 202 may input the user vector-S as a third parameter to the recommendation model 227.

The user device 202 may, for example, input N intermediate operation values received from the server 201 through the second communication circuit 221 to the recommendation model-U 227 as input values.

In an embodiment, the recommendation model-U 227 may use the first parameter and the second parameter (or, the first parameter, the second parameter, and the third parameter) to score the nth intermediate operation value within a designated range (e.g., 0 to 100), and output the score n for the nth intermediate operation value as a result value. The score n may be used as a reference value for recommending the nth item. For example, an item with a high score than an item with a low score may be preferentially recommended to a user.

In another embodiment, the display control module 228 may control display of N items based on the score information received from the recommendation model-U 227. For example, the display control module 228 may control display of item information so that an item with a high score is preferentially exposed to a user over an item with a low score.

Figure 3:
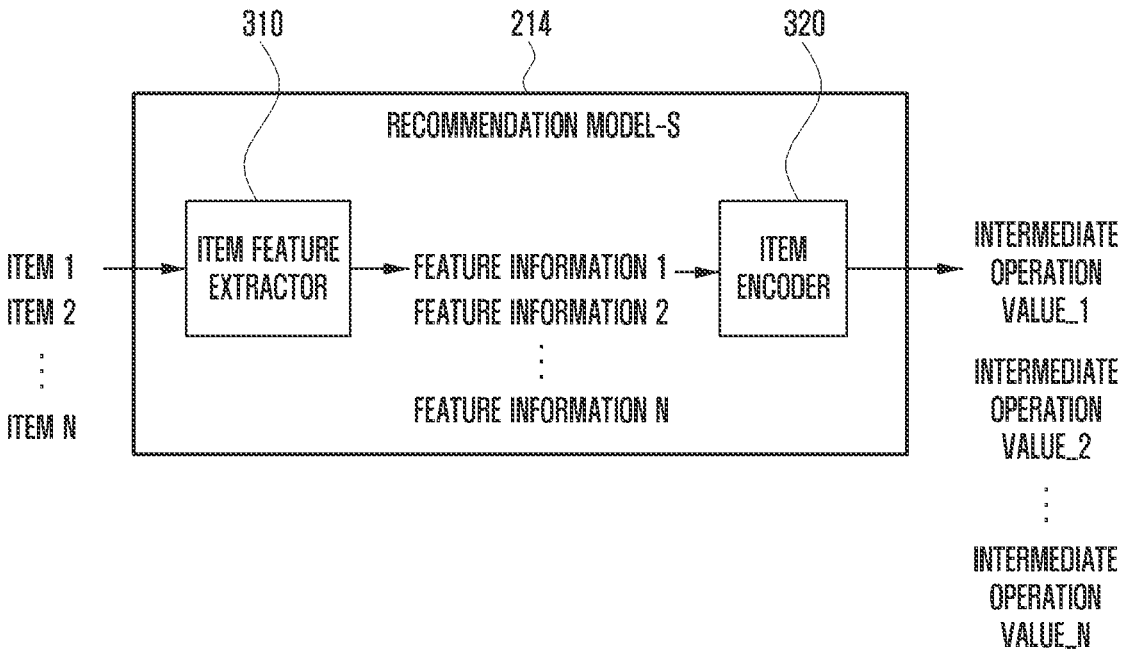
FIG. 3 is a block configuration diagram of a recommendation model-S configured in a server in a recommendation system according to an embodiment of the disclosure.

FIG. 3 is a block configuration diagram of a recommendation model-S 214 according to an embodiment of the disclosure.

Referring to FIG. 3, a recommendation model-S 214 may be logically divided to an item feature extractor 310 and an item encoder 320. The contents described in FIG. 2 are briefly described or omitted.

The item feature extractor 310 may sequentially receive N items from item 1 to item N from the data provision module 215. The item feature extractor 310 may extract feature information from the received n-th item. The extracted individual feature information may, for example, be converted into a character string or a real number (e.g., an integer or a fraction). Feature information may consist of a combination of characters and real numbers. The item encoder 320 may sequentially receive N pieces of feature information from feature information 1 to feature information N from the item feature extractor 310. In another embodiment, the item encoder 320 may encode the received n-th feature information into an intermediate operation value. The data provision module 215 may sequentially receive N intermediate operation values from the intermediate operation value_1 to the intermediate operation value_N from the item encoder 320, and may transmit the N intermediate operation values to the user device 202 through the first communication circuit 211.

Figure 4:
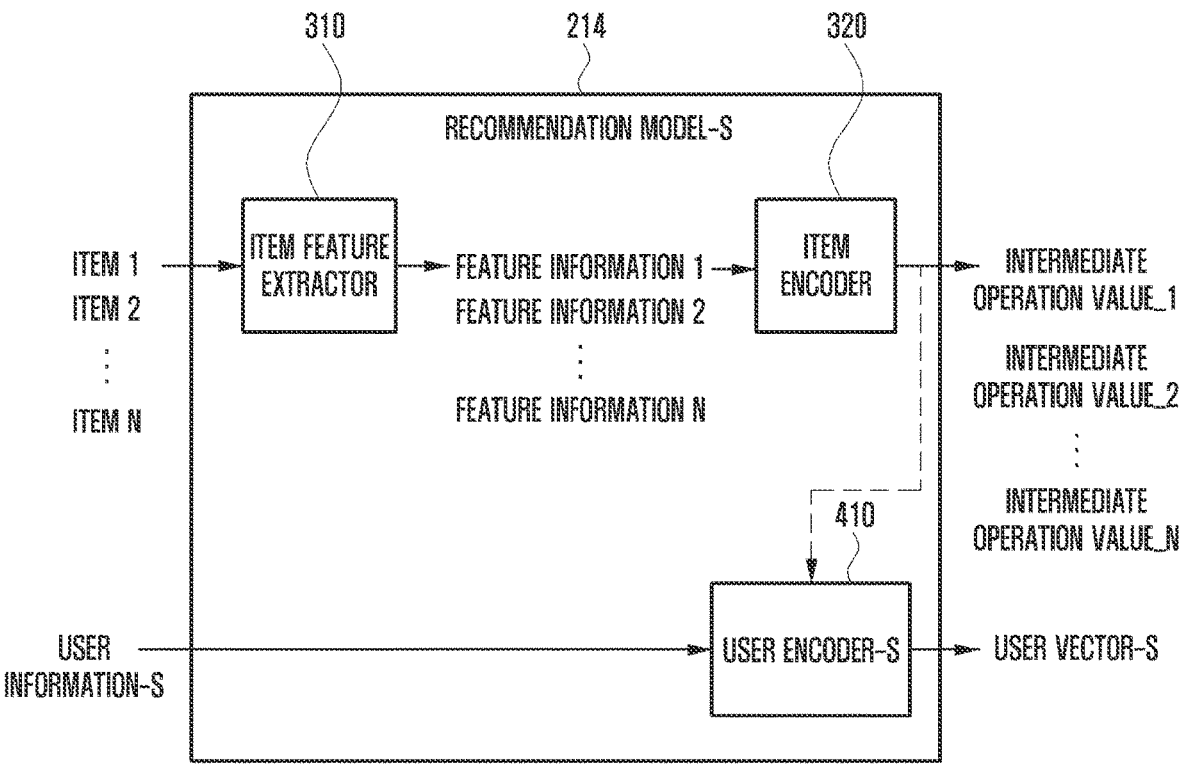
FIG. 4 is a block configuration diagram of a recommendation model-S according to an embodiment of the disclosure.

FIG. 4 is a block configuration diagram of a recommendation model-S 214 according to an embodiment of the disclosure.

Referring to FIG. 4, a recommendation model-S 214 may be logically divided to an item feature extractor 310, an item encoder 320, and a user encoder-S 410. The contents described in FIGS. 2 and 3 are briefly described or omitted.

In one embodiment, a user encoder-S 410 may receive user information-S from the data provision module 215. The user encoder-S 410 may encode the received user information-S into a user vector-S.

In another embodiment, the user encoder-S 410 may receive the N intermediate operation values, output by the item encoder 320 as the result values, as parameters used to express the user's interest (or preference) for individual items to be recommended to the user. The user encoder-S 410 may encode the user information-S into a user vector-S by using the received parameters.

In still another embodiment, the user encoder-S 410 may send the user vector-S as a reply to the data provision module 215. The data provision module 215 may transfer the user vector-S received from the user encoder-S 410 to the user device 202 through the first communication circuit 211.

Figure 5:
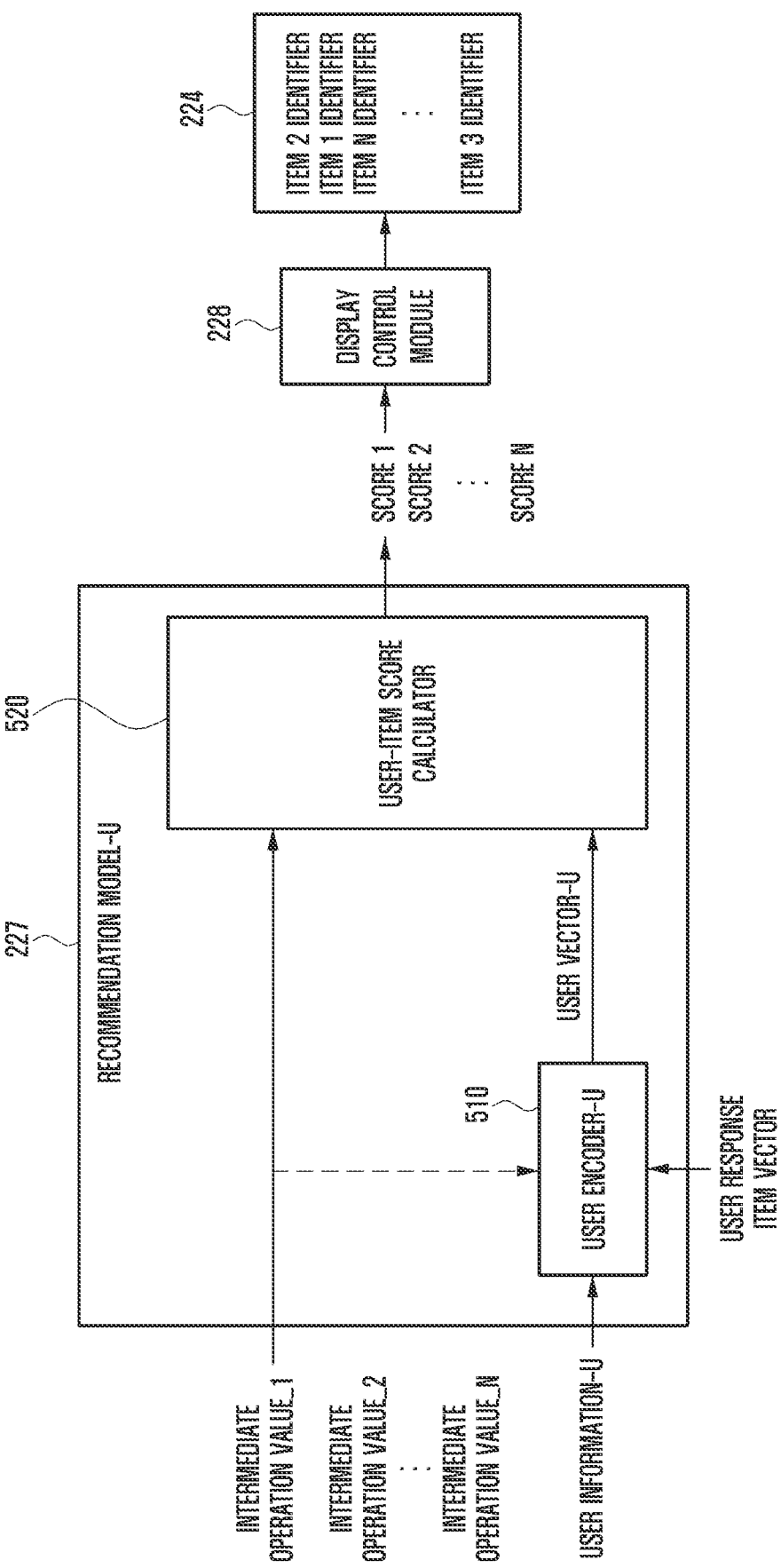
FIG. 5 is a block configuration diagram of a recommendation model-U configured in a user device in a recommendation system according to an embodiment of the disclosure.

FIG. 5 is a block configuration diagram of a recommendation model-U 227 according to an embodiment of the disclosure.

Referring to FIG. 5, a recommendation model-U 227 may be logically divided to a user encoder-U 510 and a user-item score calculator 520. The contents described in FIG. 2 are briefly described or omitted.

According to an embodiment, the user encoder-U may receive, from the user response collection module 226, a user response item vector as a first parameter used to represent the user's interest (or preference) for individual items to be recommended to the user. The user encoder-U 510 may receive the user information-U from the user information provision module 225. The user encoder-U 510 may encode the user information-U into a user vector-U by using the first parameter.

According to another embodiment, the user encoder-U 510 may receive, from the server 201 via the second communication circuit 221, N intermediate operation values as a second parameter used to represent the user's interest (or preference) for the individual items to be recommended to the user. The user encoder-U 510 may encode the user information-U into a user vector-U by using the first parameter and the second parameter.

The user-item score calculator 520 may receive, from the user encoder-U 510, the user vector-U as a parameter used to assign a score to the item to be recommended to the user. The user-item score calculator 520 may, for example, sequentially receive N intermediate operation values from intermediate operation value_1 to intermediate operation value_N from the server 201 via the second communication circuit 221. The user-item score calculator 520 may calculate a score for the Nth intermediate operation value by using the parameters. The user-item score calculator 520 may output the calculated n scores to the display control module 228. The display control module 228 may determine a rank of the items based on the scores assigned to each of the items. According to another embodiment, the display control module 228 may display identifiers (e.g., titles) corresponding to the items on the display 224, by arranging the identifiers according to a determined rank. For example, the display control module 228 may arrange the identifiers in descending order of rank (or scores) and display the arranged identifiers on the display 224. In another example, as illustrated, an item 2 identifier, an item 1 identifier, an item N identifier, . . . , and an item 3 identifier may be arranged in the list in descending order of ranks. In still another example, the display control module 228 may select items having a score equal to or greater than a designated value, or items having a determined rank equal to or greater than a designated rank, and display the identifiers representing the selected items on the display 224. As yet another example, the display control module 228 may display the calculated scores respectively corresponding to the identifiers on the display 224, along with the identifiers.

FIG. 6 is a block configuration diagram of a recommendation model-U 227 according to an embodiment of the disclosure.

Referring to FIG. 6, a recommendation model-U 227 may be logically divided to a user encoder-U 510, a user-item score calculator 520, and a user vector combiner 61. The contents described in FIGS. 2 and 5 are briefly described or omitted.

In one embodiment, the user vector combiner 610 may receive a user vector-S from the server 201 through the communication circuit 221. The user vector combiner 610 may combine the received user vector-S with a user vector-U, which is a result output by the user encoder-U 510, so as to obtain an end user vector.

In another embodiment, the user vector combiner 610 may receive N intermediate operation values from the server 201 through the communication circuit 221. The user vector combiner 610 may use N intermediate operation values as parameters for obtaining the end user vector.

In yet another embodiment, the user-item score calculator 520 may use the end user vector received from the user vector combiner 610, as a parameter for assigning a score to the intermediate operation values.

Figure 7:
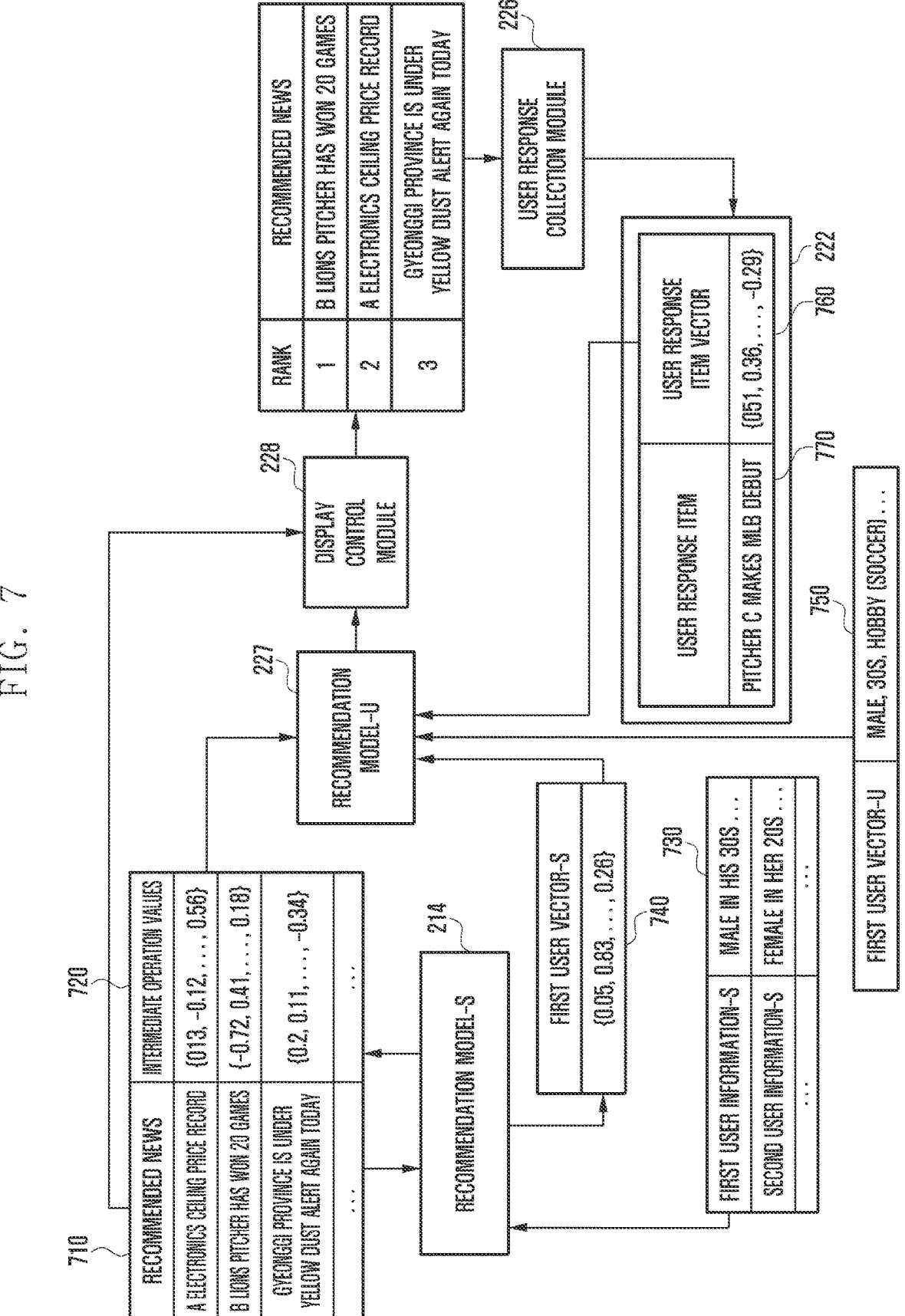
FIG. 7 illustrates a news recommendation service according to an embodiment of the disclosure.

FIG. 7 illustrates a news recommendation service according to an embodiment of the disclosure. In the description of FIG. 7, contents overlapping with those previously described through FIGS. 2 to 6 are briefly described or omitted.

Referring to FIG. 7, recommended news 710 may be sequentially input to a recommendation model-S 214, and as a result, intermediate operation values 720 may be sequentially output from the recommendation model-S 214. Each of the intermediate operation values 720 may be bundled with the corresponding recommended news 710 and transmitted to a user device 202 of a first user. User information-S 730 of the first user may, for example, be input to the recommendation model-S 214, and as a result, a first user vector-S 740 may be output from the recommendation model-S 214. The first user vector-S 740 may be transmitted to the user device 202 of the first user.

In an embodiment, the intermediate operation values 720 received by the user device 202 from the recommendation model-S 214 of the server 201 may be sequentially input to the recommendation model-U 227, and as a result, scores may be sequentially output from the recommendation model-U 227 to the display control module 228. For example, the recommendation model-U 227 may receive a first user vector-S 740 as a first parameter from the recommendation model-S 214 of the server 201. The recommendation model-U 227 may obtain first user information-U 750 as a second parameter from the user device 202. In another embodiment, the recommendation model-U 227 may acquire a user response item vector 760 as a third parameter from the user device 202. The user response item vector 760 is an item vector corresponding to the news 770 to which a first user has responded, and may be collected by the user response collection module 226 and transmitted to the recommendation model-U 227. The recommendation model-U 227 may calculate scores for intermediate operation values by using the parameters.

The display control module 228 may, for example, determine a rank of the recommended news 710 based on the scores respectively assigned to the recommended news 710. The display control module 228 may display the titles (identifiers) of the recommended news 710 on the display 224 by arranging them according to the rank assigned to each of the recommended news 710. For example, news titled "B Lions Pitcher has won 20 Games" and news titled "A Electronics Ceiling Price Record" may receive the first and second highest scores, respectively, and their titles may be arranged in descending order and introduced to a first user. The first news may be considered to be recommended because the first user has seen the news "Pitcher C makes MLB debut" with a similar topic of sports in the past. The second news may be considered to be recommended to the first user based on the fact that the recommendation model-U 227 has been trained with training data of "males in their 30s read a lot of stock-related news" and the user profile of the first user being a male in his 30s. In another embodiment, the display control module 228 may increase the reliability of the recommendation by providing the user with the recommended news, along with a user profile related to the reason and/or basis for recommending the news, through the display 224.

The user response collection module 226 may, for example, collect information on the recommended news to which the user has responded among the recommended news 710 introduced to the user through the display 224 and a user response item vector of the corresponding recommended news, and may store the collected information and vector in the memory 222. The user response item vector updated in the memory 222 may be used as an input value to be input to the recommendation model-U 227 later.

FIG. 8 is a flowchart illustrating operations of the second processor 223 for item recommendation according to an embodiment of the disclosure. The contents described in FIG. 2 are briefly described or omitted.

Referring to FIG. 8, in operation 810, a second processor 223 may collect a user response item vector from a second memory 222. The user response item vector may correspond to an item to which a user has responded among items provided from a server 201 to a user device 202 and introduced to a user through a display 224.

In operation 820, the second processor 223 may, for example, receive item information about items (N items) and intermediate operation values (N values) from the server 201 through the second communication circuit 221.

In operation 830, the second processor 223 may input, as input values, the intermediate operation values received from the server 201 to the recommendation model-U 227, and may input user information-U and a user response item vector to the recommendation model-U 227, as a parameter used to assign a score to each of the intermediate operation values received from the server.

In operation 840, the second processor 223 may, for example, obtain scores respectively assigned to items (N items) from the result value output from the recommendation model-U 227.

In operation 850, the second processor 223 may provide item information received from the server 201 to the user through the display 224 based on the scores assigned to the items.

In some embodiments, an electronic device (e.g., the user device 202 of FIG. 2) may include a communication circuit configured to communicate with a server, a display, a processor connected to the communication circuit and the display, and a memory connected to the processor, wherein the memory is configured to store instructions which, when executed by the processor, cause the processor to collect an intermediate operation value corresponding to an item to which a user has responded among first items introduced to the user through the display and store, in the memory, the collected intermediate operation value as a user response item vector, receive item information about second items to be introduced to the user and intermediate operation values corresponding to the respective second items from the server through the communication circuit, input, as an input value, the intermediate operation values received from the server to a recommendation model (e.g., the recommendation model-U 227 of FIG. 2) trained using an artificial intelligence algorithm, input, to the recommendation model, first user information indicating a profile of the user and the user response item vector as a parameter for assigning a score to each of the second items, obtain scores assigned to each of the second items from a result value output from the recommendation model by inputting the input value and the parameter to the recommendation model, and provide the item information to the user through the display based on the scores assigned to each of the second items.

The instructions may cause the processor to receive a user vector corresponding to second user information of the user and represented by a plurality of real values from the server through the communication circuit, and to input the user vector as an additional parameter to the recommendation model.

The instructions may further cause the processor to arrange identifiers representing each of the second items in descending order of scores assigned thereto, and display the arranged identifiers on the display.

The instructions may further cause the processor to select items having a score equal to or higher than a designated value from among the second items, and display identifiers representing the selected items on the display.

The instructions may further cause the processor to sequentially input the intermediate operation values received from the server to the recommendation model, and sequentially acquire scores assigned to the second items from the recommendation model.

In the electronic device, the recommendation model is configured to encode the first user information into a user vector represented by a plurality of real values, and assign a score to an item corresponding to the intermediate operation value received from the server through the communication circuit, by using the first user vector.

In the electronic device, the recommendation model may, for example, be configured to encode the first user information into a first user vector represented by a plurality of real values, receive a second user vector corresponding to second user information of the user and represented by a plurality of real values from the server through the communication circuit, combine the first user vector and the second user vector so as to obtain an end user vector, and assign a score to an item corresponding to the intermediate operation value received from the server through the communication circuit, by using the end user vector.

The recommendation model may be configured to use intermediate operation values received from the server as a parameter for obtaining the end user vector.

In some embodiments, a recommendation system may include a server (e.g., the server 201 of FIG. 2), and a user device (e.g., the user device 202 of FIG. 2). The server may be configured to encode a recommended item to be introduced to a user of the user device into an intermediate operation value represented by a plurality of real values, and transmit information regarding the recommended item and the intermediate operation value to the user device. In an embodiment, the user device may be configured to encode first user information representing a profile of the user into a first user vector represented by a plurality of real values, assign a score to the recommended item by using the first user vector and the intermediate operation value received from the server, and control display of information regarding the recommended items based on the score.

In another embodiment, the server may be configured to encode second user information of the user into a second user vector represented by a plurality of real values, and transmit the second user vector to the user device.

The server may be configured to use the intermediate operation value to be transmitted to the user device as a parameter for obtaining the second user vector.

In yet another embodiment, the user device may be configured to combine the first user vector with the second user vector received from the server so as to obtain an end user vector, and assign a score to the recommended item by using the end user vector and the intermediate operation value received from the server.

The user device may, for example, be configured to use the intermediate operation value received from the server as a parameter for obtaining the end user vector.

A method for operating an electronic device (e.g., the user device 202 of FIG. 2) may include collecting an intermediate operation value corresponding to an item to which a user responds among first items introduced to the user through the display of the electronic device and storing, in the memory of the electronic device, the collected intermediate operation value as a user response item vector, receiving item information about second items to be introduced to the user and intermediate operation values corresponding to the respective second items from the server through the communication circuit of the electronic device, inputting, as an input value, the intermediate operation values received from the server to a recommendation model trained using an artificial intelligence algorithm and inputting, to the recommendation model, first user information indicating a profile of the user and the user response item vector as a parameter for assigning a score to each of the second items, obtaining scores assigned to each of the second items from a result value output from the recommendation model by inputting the input value and the parameter to the recommendation model, and providing the item information to the user through the display based on the scores assigned to each of the second items.

The method may further include receiving a user vector corresponding to second user information of the user and represented by a plurality of real values from the server through the communication circuit, and inputting the user vector as an additional parameter to the recommendation model.

The providing of the item information to the user through the display may, for example, include arranging identifiers representing each of the second items in descending order of scores assigned thereto, and displaying the arranged identifiers on the display.

The providing of the item information to the user through the display may include selecting items having a score equal to or higher than a designated value from among the second items, and displaying identifiers representing the selected items on the display.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:

a communication circuit configured to communicate with a server;

a display;

at least one processor connected to the communication circuit and the display; and memory connected to the at least one processor, wherein the memory stores instructions that, when executed by the at least one processor, cause the electronic device to:

collect an intermediate operation value corresponding to an item to which a user has responded among first items introduced to the user through the display, and store, in the memory, the collected intermediate operation value as a user response item vector, receive item information about second items to be introduced to the user and intermediate operation values corresponding to the respective second items from the server through the communication circuit, the second items identified by the server using an estimated profile of the user, input, as an input value, the intermediate operation values received from the server to a recommendation model trained using an artificial intelligence algorithm, acquiring a profile of the user containing personal information of the user stored in the memory without exposing the personal information outside of the electronic device, input, to the recommendation model, first user information indicating the acquired profile of the user and the user response item vector as a parameter for assigning a score to each of the second items, obtain scores assigned to each of the second items from a result value output from the recommendation model by inputting the input value and the parameter to the recommendation model, and provide the item information to the user through the display based on the scores assigned to each of the second items.

2. The electronic device of claim 1, wherein the instructions are further configured to cause the electronic device to:

receive a user vector corresponding to second user information of the user and represented by a plurality of real values from the server through the communication circuit, and input the user vector as an additional parameter to the recommendation model.

3. The electronic device of claim 1, wherein the instructions are further configured to cause the electronic device to:

arrange identifiers representing each of the second items in descending order of scores assigned thereto, and display the arranged identifiers on the display.

4. The electronic device of claim 1, wherein the instructions are further configured to cause the electronic device to:

select items having a score equal to or higher than a designated value from among the second items, and display identifiers representing the selected items on the display.

5. The electronic device of claim 1, wherein the instructions are further configured to cause the electronic device to:

sequentially input the intermediate operation values received from the server to the recommendation model, and sequentially acquire scores assigned to the second items from the recommendation model.

6. The electronic device of claim 1, wherein the recommendation model is configured to:

encode the first user information into a user vector represented by a plurality of real values, and assign a score to an item corresponding to the intermediate operation value received from the server through the communication circuit, by using a first user vector.

7. The electronic device of claim 1, wherein the recommendation model is configured to:

encode the first user information into a first user vector represented by a plurality of real values, receive a second user vector corresponding to second user information of the user and represented by a plurality of real values from the server through the communication circuit, combine the first user vector and the second user vector so as to obtain an end user vector, and assign a score to an item corresponding to the intermediate operation value received from the server through the communication circuit, by using the end user vector.

8. The electronic device of claim 7, wherein the recommendation model is configured to use the intermediate operation values received from the server as a parameter for obtaining the end user vector.

9. The electronic device of claim 1, wherein the personal information includes at least one of age, gender, address, hobbies, interests, or favorite items.

10. A recommendation system comprising:

a server; and a user device, wherein the server is configured to:

identify a recommended item using an estimated profile of a user of the user device without receiving personal information of the user from the user device, encode the recommended item to be introduced to the user of the user device into an intermediate operation value represented by a plurality of real values, and transmit information regarding the recommended item and the intermediate operation value to the user device, and wherein the user device is configured to:

encode first user information representing an acquired profile of the user into a first user vector represented by a plurality of real values, the acquired profile of the user containing personal information of the user stored in memory of the user device without exposing the personal information outside of the user device, assign a score to the recommended item by using the first user vector and the intermediate operation value received from the server, and control display of information regarding the recommended item based on the score.

11. The electronic device of claim 1, wherein the electronic device comprises a user device and the recommendation model includes an artificial intelligence model that is machine-trained using an artificial intelligence algorithm stored in the memory of the electronic device.

12. The electronic device of claim 1, wherein the recommendation model is further configured to assign scores to recommended news items, and wherein the electronic device further comprises a display control model, the display control model configured to:

determine a rank of the recommended news items based on the assigned scores, and display titles of the recommended news items accord-
ing to the rank.

13. The recommendation system of claim 10, wherein the estimated profile is estimated based on information about an item to which the user has responded, among previously recommended items, from the user device.

14. The recommendation system of claim 10, wherein the server is further configured to:

encode second user information of the user into a second user vector represented by a plurality of real values, and transmit the second user vector to the user device.

15. The recommendation system of claim 14, wherein the server is further configured to use the intermediate operation value to be transmitted to the user device as a parameter for obtaining the second user vector.

16. The recommendation system of claim 14, wherein the user device is further configured to:

combine the first user vector with the second user vector received from the server so as to obtain an end user vector, and assign a score to the recommended item by using the end user vector and the intermediate operation value received from the server.

17. The recommendation system of claim 16, wherein the user device is further configured to use the intermediate operation value received from the server as a parameter for obtaining the end user vector.

18. A method performed by an electronic device, the method comprising:

collecting an intermediate operation value corresponding to an item to which a user responds among first items introduced to a user through a display of the electronic device, and storing, in a memory of the electronic device, the collected intermediate operation value as a user response item vector;

receiving item information about second items to be introduced to the user and intermediate operation values corresponding to the respective second items from a server through a communication circuit of the electronic device, the second items identified by the server using an estimated profile of the user;

acquiring a profile of the user containing personal information of the user stored in memory of the electronic device without exposing the personal information outside of the electronic device;

inputting, as an input value, the intermediate operation values received from the server to a recommendation model trained using an artificial intelligence algorithm, and inputting, to the recommendation model, first user information indicating the acquired profile of the user and the user response item vector as a parameter for assigning a score to each of the second items;

obtaining scores assigned to each of the second items from a result value output from the recommendation model by inputting the input value and the parameter to the recommendation model; and providing the item information to the user through the display based on the scores assigned to each of the second items.

19. The method of claim 18, further comprising:

receiving a user vector corresponding to second user information of the user and represented by a plurality of real values from the server through the communication circuit; and inputting the user vector as an additional parameter to the recommendation model.

\* \* \* \* \*